United States Patent [19]

Yamaguchi et al.

[11] Patent Number: 5,895,767
[45] Date of Patent: Apr. 20, 1999

[54] CRYSTALLIZED GLASS AND METHOD FOR MANUFACTURING THE SAME

[75] Inventors: Katsuhiko Yamaguchi; Naoyuki Goto, both of Sagamihara, Japan

[73] Assignee: Kabushiki Kaisha Ohara, Sagamihara, Japan

[21] Appl. No.: 08/778,361

[22] Filed: Jan. 2, 1997

Related U.S. Application Data

[63] Continuation of application No. 08/402,375, Mar. 13, 1995, abandoned.

[30] Foreign Application Priority Data

Mar. 15, 1994 [JP] Japan ................................. 6-043982

[51] Int. Cl.$^6$ ................................................. C03C 10/12
[52] U.S. Cl. ...................... 501/7; 501/32; 501/63; 501/69; 501/72
[58] Field of Search ........................ 501/7, 32, 63, 501/69, 72

[56] References Cited

U.S. PATENT DOCUMENTS

| | | | |
|---|---|---|---|
| 3,497,366 | 2/1970 | Simmons | 501/7 |
| 3,812,689 | 5/1974 | Reade | 501/7 |
| 3,907,577 | 9/1975 | Kiefer et al. | 501/7 |
| 3,923,528 | 12/1975 | Kume | 501/63 |
| 3,985,533 | 10/1976 | Grossman | 501/7 |
| 4,192,665 | 3/1980 | Chyung et al. | |
| 4,755,488 | 7/1988 | Nagashima | 501/4 |

FOREIGN PATENT DOCUMENTS

| | | |
|---|---|---|
| 58-49633 | 3/1983 | Japan . |
| 1-57058 | 12/1989 | Japan . |

*Primary Examiner*—Mark L. Bell
*Assistant Examiner*—Louis M. Troilo
*Attorney, Agent, or Firm*—Oliff & Berridge, PLC

[57] ABSTRACT

A crystallized glass and a manufacturing method therefor are disclosed. The crystallized glass comprises β-spodumene solid solution as the predominant crystal phase, and is produced by forming a melted raw glass, cooling and thereafter heat-treating it. The raw glass has a composition comprising, expressed in terms of weight percent: 52–65% $SiO_2$; 8–15% $Al_2O_3$; 0–4% $P_2O_5$, 3–8% $TiO_2$, and 0–4% $ZrO_2$, wherein the following inequality is satisfied, $0.1 < (\% \text{ of } P_2O_5 + \% \text{ of } ZrO_2)/(\% \text{ of } TiO_2) < 0.8$; 0–10% ZnO, 0–10% MgO, and 0–5% BaO, wherein the following inequality is satisfied, $<(\% \text{ of } ZnO + \% \text{ of } MgO + \% \text{ of } BaO) < 15$; 3–12% $Li_2O$; 0–4% $K_2O$; and $As_2O_3$ and $Sb_2O_3$, wherein the following inequality is satisfied, $0 < \% \text{ of } As_2O_3 + \% \text{ of } Sb_2O_3 < 2$.

9 Claims, No Drawings

CRYSTALLIZED GLASS AND METHOD FOR MANUFACTURING THE SAME

This is a Continuation of application Ser. No. 08/402,375 filed Mar. 13, 1995 now abandoned.

BACKGROUND OF THE INVENTION

1. Field of the Invention

The present invention relates to a crystallized glass and a method of manufacturing the same, for example, to a crystallized glass adapted for various kinds of materials which require a fine processing or a precision processing, e.g., material for electronic parts, material for a substrate for electronic parts, material for magnetic disk substrates, or the like.

2. Description of Related Art

A crystallized glass comprising β-spodumene solid solution as the predominant crystal phase is used as a high-strength material because of its high mechanical strength and low expansion coefficient, and is also used for dishes which double as cooking utensils, a top plate for an electromagnetic cooking device and the like because the appearance thereof has a white colour and gives an impression of cleanliness and stains thereon easily come out. In the electronic industry, such a crystallized glass is used for a setter for burning for electronic parts and the like, an insulating protection tube for a heater, and the like. Recently, because a crystal having a length of about 1 μm can be deposited, the crystallized glass is also used for material for electronic parts, and material for a substrate.

Such a crystallized glass comprising β-spodumene solid solution as the predominant crystal phase is generally obtained by melting a raw glass, forming, and cooling the material, and then carrying out a heat-treatment for nucleation and by carrying out a subsequent heat-treatment for crystallization.

Japanese Patent Application Publication (Examined) No. Tokuko-Hei 1-57058 discloses a crystallized glass, the strength of which is improved by properly controlling growth of both β-spodumene crystal and cristobalite crystal to deposit during crystallizing a raw glass. Japanese Patent Application Publication (Unexamined) No. Tokukai-Sho 58-49633 discloses a glass that contains fine crystal particles and has a greater mechanical strength and a lower coefficient of expansion, which is produced by combining F and $As_2O_3$, which are necessary constituents for crystallization, with crystal nucleating agents. In addition, U.S. Pat. No. 4,192,665 teaches crystallized glass produced by crystallization of raw glass of composition: $Li_2O$—$Al_2O_3$—$SiO_2$—$MgO$—$ZnO$—$TiO_2$ at a crystallization temperature lower than 1000° C.

However, in those conventional crystallized glass of the above references, there have been some problems that because the raw glass is melted at a high temperature not less than about 1500° C., clarification in melting tends to decrease. Also, both temperatures for nucleating and crystallization of the above products of crystallized glass are high, and in particular the crystallization temperatures are 900 to 1000° C. so that coarse particles are likely to form in crystals to pose problems in quality. In addition, in crystallized glass which requires F as a necessary constituent, it has been disadvantageous that glass homogeneity is impaired because of evaporation of F upon melting.

SUMMARY OF THE INVENTION

The present invention was developed in view of the above-described problems. An object of the present invention is to provide an improved crystallized glass having a good heat resisting property and a mechanical strength in addition to an excellent workability, which enables lowering the temperatures for both melting and heat treatment for crystallization, and thereby enables obtaining enhanced clarification in melting of raw glass, improved homogeneity of glass, and fine-grained crystal.

In order to achieve the above-mentioned objects, the present inventors have extensively studied to find that a crystallized glass containing fine-grained crystals can be obtained by utilizing $TiO_2$, $ZrO_2$ and $P_2O_5$ as nucleating agents and by controlling the composition ratio of $TiO_2$, $ZrO_2$ and $P_2O_5$ when a raw glass of $SiO_2$—$Al_2O_3$—$Li_2O$ system is used for manufacturing a crystallized glass. In addition, it has been found that the presence of Mgo, BaO and ZnO together with the above nucleating agents can significantly lower the melting temperature of raw glass to produce crystallized glass excellent in uniformity.

The present invention has been accomplished on the basis of the above findings. In accordance with one aspect of the present invention, the crystallized glass comprises β-spodumene solid solution as the predominant crystal phase, and is produced by forming a melted raw glass, cooling and thereafter heat-treating it, wherein the raw glass has a composition comprising, expressed in terms of weight percent: 52–65% $SiO_2$; 8–15% $Al_2O_3$; 0–4% $P_2O_5$, 3–8% $TiO_2$, and 0–4% $ZrO_2$, wherein the following inequality is satisfied, 0.1<(% of $P_2O_5$+% of $ZrO_2$)/(% of $TiO_2$)<0.8; 0–10% ZnO, 0–10% MgO, and 0–5% BaO, wherein the following inequality is satisfied, 3<(% of ZnO+% of MgO+% of BaO)<15; 3–12% $Li_2O$; 0–4% $K_2O$; and $As_2O_3$ and $Sb_2O_3$, wherein the following inequality is satisfied, 0<% of $As_2O_3$+% of $Sb_2O_3$<2.

Accordingly, because the raw glass has the composition as described above, the melting temperature of raw glass can be not only made lower, but also the temperature to have crystal nucleus formed and crystallize is lowered. Thus, the clarification in melting of raw glass is improved, resulting crystallized glass has fine particles of crystals, and good homogeneity can be obtained.

In accordance with another aspect of the present invention, the crystallized glass comprises β-spodumene solid solution as the predominant crystal phase, and is produced by forming a melted raw glass, cooling and thereafter heat-treating it, wherein the raw glass has a composition comprising, expressed in terms of weight percent: 52–65% $SiO_2$; 8–15% $Al_2O_3$; 0–4% $P_2O_5$, 3–8% $TiO_2$, and 0–4% $ZrO_2$, wherein the following inequality is satisfied, 0.1<(% of $P_2O_5$+% of $ZrO_2$)/(% of $TiO_2$)<0.8; 2–8% ZnO; 2–8% MgO; 0.5–4% BaO; 3–12% $Li_2O$; 0–4% $K_2O$; and $As_2O_3$ and $Sb_2O_3$, wherein the following inequality is satisfied, 0<(% of $As_2O_3$+% of $Sb_2O_3$)<2.

Accordingly, the melting temperature of raw glass can be not only made lower, but also the heat treatment temperature of crystal nucleating is lowered. Thus, the clarification in melting of raw glass is improved, resulting crystallized glass has fine particles of crystals, and hence good homogeneity can be obtained.

In accordance with another aspect of the present invention, the method of manufacturing a crystallized glass comprising β-spodumene solid solution as the predominant crystal phase, comprises the steps of:

melting a raw glass, forming, and cooling the material, wherein the raw glass has a composition comprising, expressed in terms of weight percent: 52–65% $SiO_2$; 8–15%

$Al_2O_3$; 0–4% $P_2O_5$, 3–8% $TiO_2$, and 0–4% $ZrO_2$, wherein the following inequality is satisfied, 0.1<(% of $P_2O_5$+% of $ZrO_2$)/(% of $TiO_2$)<0.8; 0–10% ZnO, 0–10% MgO, and 0–5% BaO, wherein the following inequality is satisfied, 3<% of ZnO+% of MgO+% of BaO<15; 3–12% $Li_2O$; 0–4% $K_2O$; and $As_2O_3$ and $Sb_2O_3$, wherein the following inequality is satisfied, 0<% of $As_2O_3$+% of $Sb_2O_3$<2;

carrying out a first heat-treatment to the cooled material at a first temperature at which nucleation develops in the material; and thereafter carrying out a second heat-treatment to the material at a second temperature which is higher than the first temperature and at which crystallization proceeds in the material.

In accordance with another aspect of the present invention, the method of manufacturing a crystallized glass comprising β-spodumene solid solution as the predominant crystal phase, comprises the steps of:

melting a raw glass, forming, and cooling the material, wherein the raw glass has a composition comprising, expressed in terms of weight percent: 52–65% $SiO_2$; 8–15% $Al_2O_3$; 0–4% $P_2O_5$, 3–8% $TiO_2$, and 0–4% $ZrO_2$, wherein the following inequality is satisfied, 0.1<(% of $P_2O_5$+% of $ZrO_2$)/(% of $TiO_2$)<0.8; 2–8% ZnO; 2–8% MgO; 0.5–4% BaO; 3–12% $Li_2O$; 0–4% $K_2O$; and $As_2O_3$ and $Sb_2O_3$, wherein the following inequality is satisfied, 1<% of $As_2O_3$+% of $Sb_2O_3$<2;

carrying out a first heat-treatment to the cooled material at a first temperature at which nucleation develops in the material; and thereafter carrying out a second heat-treatment to the material at a second temperature which is higher than the first temperature and at which crystallization proceeds in the material.

Preferably, the first temperature is in the range of 500–650° C. The second temperature is preferably in the range of 700–900° C.

According to the method of the present invention, the raw glass of each composition described above is after melted and cooled, first heat treatment is applied at a temperature permitting nucleating, for example, in a range of 500 to 650° C., and subsequently second heat treatment is applied at a crystallization temperature higher than the first heat treatment temperature, for example, in a range of 700 to 900° C. This indicates that the raw glass can be melted at lower temperatures than that of conventional methods, and that nucleating and crystallization can occur at lower temperatures than conventional ones. Accordingly, the clarification in melting of the raw glass of the present invention is improved, and the crystallized glass having fine particles of crystals and good homogeneity can be easily obtained.

The oxide composition of crystallized glass of this invention is expressed by the oxide composition of the above raw glass, and the reasons for which the composition of each oxide constituting raw glass is limited to the above range will be described as follows.

As to $SiO_2$, the amount is limited to 52 to 65% by weight because the crystal size of resulting crystallized glass tends to become more coarse and cracks on surface are often formed during crystallization when the amount of $SiO_2$ is less than the lower limit. Also, when the amount of $SiO_2$ is more than the upper limit, clarification in melting is hardly obtained, and the resulting crystallized glass becomes poor in homogeneity.

As to $A_2O_3$, the amount is limited to 8 to 15% by weight because the formation of the β-spodumene solid solution tends to be difficult during crystallization when the amount of $Al_2O_3$ is less than the lower limit. Also, when the amount of $Al_2O_3$ is more than the upper limit, melting characteristics become poor, and the resulting crystallized glass tends to be impaired in homogeneity.

$P_2O_5$, $ZrO_2$, and $TiO_2$ function as nucleating agents, and the presence of $P_2O_5$ and/or $ZrO_2$ together with $TiO_2$ induces precursors of crystals, and crystallization at lower temperatures can be realized. The reason why the ratio of $P_2O_5$ and/or $ZrO_2$ to $TiO_2$, that is, ($P_2O_5$ (weight %)+$ZrO_2$ (weight %))/$TiO_2$ (weight %) is more than 0.1 and less than 0.8 is that, when the amount is more than the upper limit, the crystal size of resulting crystals becomes larger, and exerting a bad influence on surface characteristics at the stage of precision polishing, and that, when the amount is less than the lower limit, it is impossible to obtain the desired effects of this invention, that is, the size reduction of crystal particles owing to crystallization at lower temperatures.

As to $P_2O_5$ and $ZrO_2$, the amount of each constituent is limited to 0 to 4% because, when the amount is more than the upper limit, the grain size of resulting crystals not only becomes larger, but also instability of glass state is likely to occur. Preferably, $P_2O_5$ is not less than 0.2% for the purpose of low temperature crystallization. As to $TiO_2$, the amount is limited to 3 to 8% by weight because, when the amount is less than the lower limit, no sufficient nucleating effect can be obtained, resulting in difficulty in formation of crystals having the desired composition. On the other hand, when the amount is more than the upper limit, the devitrification resistance of raw glass is significantly reduced.

ZnO, MgO, and BaO are all effective for an increase in low temperature melting characteristics of raw glass and homogeneity of resulting crystallized glass. The total amount of these constituents of ZnO, MgO, and BaO is limited to 3 to 15% by weight because, when the amount is less than the lower limit, it is difficult to melt the raw glass. On the other hand, when the amount is more than the upper limit, the crystal phase is adversely affected.

As to ZnO and MgO, each amount of such oxides is limited to 0 to 10% because, when the amount is more than the upper limit, the devitrification resistance of raw glass material is significantly reduced, and each amount of 2 to 8% by weight is preferable, and 3 to 8% by weight is more preferable. As to the BaO component, the amount is limited to 0 to 5% because, when the amount is more than the upper limit, the devitrification resistance of raw glass material is significantly reduced, and 0.5 to 4% by weight is preferable.

$Li_2O$ is one of major constituents of the β-spodumene solid solution together with $SiO_2$ and $Al_2O_3$, and the amount is limited to 3 to 12% by weight because, when the amount is less than the lower limit, melting characteristics of raw glass is not only impaired, but also it becomes difficult to obtain the desired composition and structure of resulting crystals. On the other hand, when the amount is more than the upper limit, the devitrification resistance of raw glass material is significantly reduced, and furthermore it becomes difficult to obtain the desired composition and structure of resulting crystals.

$K_2O$ is effective for increasing the melting characteristics of raw glass. The maximum content of $K_2O$ is 4% by weight and the preferable content thereof is in the range of 1 to 4%.

As to $As_2O_3$ and $Sb_2O_3$, either one or both of them can be added as a clarifier at the time of the melting of raw glass. The total amount of 2% by weight or less is sufficient to be effective as a clarifier.

The raw glass of the composition described above is melted and formed, cooled, and then subjected to heat treatment for obtaining crystallized glass. One example of the heat treatment conditions is described below. As the first heat treatment, the temperature is raised to a specified range of 500 to 650° C. at a temperature increase rate of 50 to 300° C. per hour. The glass is maintained at that temperature for 1 to 20 hours. Then, a second heat treatment follows the first heat treatment. The second heat treatment is conducted as follows. The glass temperature is raised to a specified range of 700 to 900° C. at a temperature increase rate of 5 to 200° C. per hour. The glass is maintained at that temperature for 0.5 to 20 hours.

It should be understood that each condition of the first and second heat treatments are not limited to the conditions described above. The first heat treatment may be any temperature if it permits nucleating. Further, the second heat treatment may be any temperature if it is capable to crystallize and is higher than the first heat treatment temperature. It is unnecessary to say that any preliminary heat treatment may be applied before the first heat treatment, and that any subsequent heat treatment may be properly performed after the above first and second heat treatments.

DESCRIPTION OF THE PREFERRED EMBODIMENTS

Hereinafter, by giving concrete Examples and Comparison Examples, the characteristics of the crystallized glass and the method for producing the same according to the present invention are clarified.

First, raw materials such as oxides and nitrates were prepared and mixed to obtain 2500 grams of glass. Raw glass materials of ten different compositions were charged into platinum melting pots in a furnace. The temperatures were controlled to deal with different melting temperatures attributable to different glass compositions. Agitation was also conducted steadily. During operation, visual observation was made to confirm that no bubbles were present in the molten glass. After the molten glass liquor was formed for desired shapes, they were cooled by reheating and heat treatment was applied. Thereby the crystallized glass of ten different compositions were obtained.

The compositions of obtained ten kinds of crystallized glass (Samples No. 1 to No. 10) are shown in Table 1.

TABLE 1

| SAMPLE NO. | | EXAMPLE | | | | | | | | | | COMPARISON EXAMPLE | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| COMPOSITION (WEIGHT %) | $SiO_2$ | 55.0 | 64.0 | 52.0 | 57.0 | 63.0 | 55.0 | 60.0 | 57.0 | 58.5 | 57.0 | 68.0 | 70.5 | 62.8 |
| | $Al_2O_3$ | 13.0 | 10.0 | 9.0 | 15.0 | 12.0 | 10.0 | 13.0 | 12.0 | 13.0 | 14.0 | 19.5 | 17.2 | 22.3 |
| | $P_2O_5$ | 1.5 | 2.0 | 3.0 | 1.0 | 1.0 | — | 2.0 | 2.0 | — | 1.0 | — | — | 0.8 |
| | $TiO_2$ | 5.0 | 5.0 | 7.0 | 5.0 | 3.0 | 5.0 | 4.0 | 6.0 | 6.0 | 5.0 | 4.5 | 4.7 | 1.8 |
| | $ZrO_2$ | 1.0 | — | 2.0 | — | — | 2.0 | — | — | 2.0 | 1.0 | — | — | — |
| | ZnO | 5.0 | 5.0 | 6.0 | 6.5 | 6.5 | 8.0 | 3.0 | 6.3 | 7.0 | 9.0 | 1.5 | 0.8 | — |
| | MgO | 8.0 | 4.5 | 6.0 | 3.5 | 4.0 | 4.8 | 6.5 | 4.0 | 7.0 | 3.0 | 3.5 | 1.8 | 0.8 |
| | BaO | 2.0 | 1.0 | 3.0 | 1.0 | 1.0 | 3.0 | 1.0 | 1.0 | 1.0 | 2.0 | — | — | — |
| | $Li_2O$ | 7.3 | 4.0 | 10.0 | 7.5 | 6.0 | 12.0 | 6.0 | 8.5 | 3.0 | 5.0 | 3.0 | 3.5 | 4.7 |
| | $K_2O$ | 2.0 | 4.0 | 1.5 | 3.0 | 3.0 | — | 4.0 | 3.0 | 2.0 | 2.5 | — | — | 0.5 |
| | $As_2O_3$ | — | — | 0.5 | — | — | — | 0.5 | — | — | — | — | 1.0 | 2.4 |
| | $Sb_2O_3$ | 0.2 | 0.5 | — | 0.5 | 0.5 | 0.2 | — | 0.2 | 0.5 | 0.5 | — | — | — |
| | $B_2O_3$ | — | — | — | — | — | — | — | — | — | — | — | 0.5 | 1.2 |
| | F | — | — | — | — | — | — | — | — | — | — | — | — | 2.4 |

Also, as to each glass ceramic of Samples No. 1 to No. 10, the melting temperature of raw glass, treating temperature and holding time at a heat treatment for nucleating (the first heat treatment), and treating temperature and holding time at a heat treatment for crystallization (the second heat treatment) are all shown in Table 2. In addition, the temperature was increased from ambient temperature to the nucleating temperature at a rate of 114° C./hour while the temperature was increased from the nucleating temperature to the crystallization temperature at a rate of 25° C./hour.

TABLE 2

| SAMPLE NO. | | EXAMPLE | | | | | | | | | | COMPARISON EXAMPLE | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| MELTING TEMPERATURE (°C.) | | 1400 | 1450 | 1400 | 1450 | 1450 | 1450 | 1450 | 1450 | 1450 | 1450 | 1600 | 1600 | 1500 |
| NUCLEATING HEAT TREATMENT | TEMPERATURE (°C.) | 600 | 500 | 550 | 650 | 600 | 650 | 550 | 550 | 550 | 650 | 750 | 800 | 800 |
| | TIME (HOUR) | 2 | 5 | 4 | 2 | 5 | 5 | 5 | 5 | 2 | 2 | 2 | 1 | 1.5 |
| CRYSTALLIZING HEAT TREATMENT | TEMPERATURE (°C.) | 780 | 780 | 780 | 850 | 800 | 800 | 750 | 780 | 780 | 850 | 1100 | 900 | 1050 |
| | TIME (HOUR) | 2 | 5 | 2 | 5 | 5 | 2 | 5 | 2 | 2 | 2 | 1 | 2 | 2 |
| HARDNESS (Hv) | | 620 | 640 | 640 | 680 | 650 | 650 | 600 | 620 | 640 | 670 | 720 | 720 | 740 |
| SURFACE ROUGHNESS Ra (Å) | | 15 | 6 | 12 | 15 | 12 | 10 | 7 | 12 | 10 | 18 | 25 | 26 | 30 |

X-ray analysis (XRD) on each of the obtained crystallized glass of Samples No. 1 to No. 10 was conducted to identify the crystal structure. It was confirmed that all samples contained the β-spodumene solid solution as their predominant crystal phase. Also, the crystal sizes of the crystallized glass of Samples No. 1 to No. 10 were found to be not more than 0.5 µm.

Furthermore, measurements were carried out to obtain Vickers hardness (Hv), and surface roughness (Ra) for each of the obtained glass ceramic of Samples No. 1 to No. 10. The results are also shown in Table 2. It should be noted that when the surface roughness was determined, the specimens of the above crystallized glass (Samples No. 1 to No. 10) were subjected to lapping treatment with sand particles having an average size of 9 to 12 μm for 10 to 20 minutes, and then were subjected to polishing treatment with cerium dioxide particles having an average size of 1 to 2 μm for 30 to 40 minutes. Then, those Samples were finally sent for measurement of surface roughness.

For purposes of comparison, samples of the β-spodumene type crystallized glass of three different compositions known conventionally prepared in the same procedure as described in the above Examples. Those three different compositions of resulting samples of crystallized glass (Samples No. 11 to No. 13) are shown in Table 1. However, as to each glass ceramic of Samples No. 11 to No. 13, the melting temperature of raw glass, treating temperature and holding time at heat treatment for nucleating, and treating temperature and holding time at heat treatment for crystallization are all shown in Table 2. Also, the temperature was increased from ambient temperature to the nucleating temperature at a rate of 120° C./hour while the temperature was increased from the nucleating temperature to the crystallization temperature at a rate of 25° C./hour. Other conditions were the same as the above Examples.

X-ray analysis (XRD) on each crystallized glass of Samples No. 11 to No. 13 was conducted, and it was confirmed that the Samples contained the β-spodumene solid solution as their predominant crystal phase and that the crystal size was not more than 0.5 μm. Also, measurements were carried out to obtain Vickers hardness (Hv) and surface roughness (Ra) for each Samples No. 11 to No. 13 of crystallized glass, and results are also shown in Table 2.

It can be seen from Tables 1 and 2 that the melting temperatures of all raw glass of the above Examples are not higher than 1450° C. while the melting temperatures of all raw glass of the above Comparison Examples are in the range of 1500 to 1600° C. Thus, it can be concluded that, by comparing with those Comparison Examples as described above, the above Examples have such advantages that the evaporation of volatile components such as $Li_2O$ and the like is few during the melting of raw glass and that the raw glass has good homogeneity. Also, in the above Examples, temperatures for a nucleating heat treatment and crystallization are 500 to 650° C., and 750 to 850° C., respectively, and are lower than the temperature for a nucleating heat treatment (750 to 800° C.) and the temperature for a crystallization heat treatment (900 to 1100° C.) of the above Comparison Examples. Hence, in the above embodiments, crystallization can be conducted at lower temperatures than in the above Comparison Examples, and they have advantage for mass production in industrial scales. In addition, crystallized glass of the above embodiments have adequate degree of abrasion on account of fine particles of crystals, and have excellent workability according to on their hardness. Further, crystallized glass of the above embodiments have small values of surface roughness (Ra) and accordingly good surface properties.

Needless to say, the present invention is not limited whatever to the above embodiments. For example, those crystallized glass compositions of Samples No. 1 to No. 10 are merely illustrative, and the content of each oxide constituent can be suitably selected from the range claimed in the present invention. In addition, each temperature of heat treatment for nucleating and crystallization can also be suitably selected from the range claimed in the present invention.

As described above, according to the crystallized glass of the present invention, raw glass thereof can be melted at lower temperatures during processing and that both steps of heat treatments for nucleating and crystallization can also be carried out at lower temperatures. Therefore, crystal grains thus formed are fine enough to provide good homogeneity. Accordingly, the crystallized glass of the present invention possesses adequate degree of abrasion to provide good polishing workability, and hence they are suitable for those various raw materials that require fine and precision processing, for example, materials for electronic components, substrate materials for electronic components, substrate materials of magnetic disks, and mechanical member materials.

Also, according to the method for manufacturing a crystallized glass of the present invention, all the steps of melting of raw glass, forming of nucleus and crystallizing can be conducted at temperatures lower than conventional ones. Hence, the clarification in melting of the raw glass is improved, and a crystallized glass having fine-grained crystals and good homogeneity can be easily produced.

What is claimed is:

1. A crystallized glass comprising β-spodumene solid solution as the predominant crystal phase, produced by forming a melted raw glass, cooling and thereafter heat-treating it, wherein the raw glass has a composition consisting essentially of, expressed in terms of weight percent: 52–65% $SiO_2$; 8–15% $Al_2O_3$; greater than 0% to 4% $P_2O_5$, 3–8% $TiO_2$, and 0–4% $ZrO_2$, wherein the following inequality is satisfied, 0.1<(% of $P_2O_5$+% of $ZrO_2$)/(% of $TiO_2$)<0.8;

greater than 0% to 10% ZnO, greater than 0% to 10% MgO, and greater than 0% to 5% BaO, wherein the following inequality is satisfied, 3<(% of ZnO+% of MgO+% of BaO)<15;

3–12% $Li_2O$; greater than 0% to 4% $K_2O$; and $As_2O_3$ and $Sb_2O_3$, wherein the following inequality is satisfied, 0<% of $As_2O_3$+% of $Sb_2O_3$<2; and wherein crystal sizes of the crystallized glass are not larger than 0.5 μm and the crystallized glass has a surface roughness of not more than 18 Å.

2. A crystallized glass as claimed in claim 1, wherein a surface roughness of the crystallized glass is not more than 15 Å.

3. A crystallized glass comprising β-spodumene solid solution as the predominant crystal phase, produced by forming a melted raw glass, cooling and thereafter heat-treating it, wherein the raw glass has a composition consisting of, expressed in terms of weight percent: 52–65% $SiO_2$; 8–15% $Al_2O_3$; greater than 0% to 4% $P_2O_5$, 3–8% $TiO_2$, and 0–4% $ZrO_2$, wherein the following inequality is satisfied, 0.1<(% of $P_2O_5$+% of $ZrO_2$)/(% of $TiO_2$)<0.8;

greater than 0% to 10% ZnO, greater than 0% to 10% MgO, and greater than 0% to 5% BaO, wherein the following inequality is satisfied, 3<(% of ZnO+% of MgO+% of BaO)<15;

3–12% $Li_2O$; greater than 0% to 4% $K_2O$; and $As_2O_3$ and $Sb_2O_3$, wherein the following inequality is satisfied 0<% if $As_2O_3$+% of $Sb_2O_3$<2; and wherein crystal sizes of the crystallized glass are not larger than 0.5 μm and the crystallized glass has a surface roughness of not more than 18 Å.

4. A crystallized glass as claim in claim 3, wherein a surface roughness of the crystallized glass is not more than 15 Å.

5. A crystallized glass substrate for a magnetic disk comprising β-spodumene solid solution as the predominant crystal phase, produced by forming a melted raw glass, cooling and thereafter heat-treating it, wherein the raw glass has a composition consisting essentially of, expressed in terms of weight percent: 52–65% $SiO_2$; 8–15% $Al_2O_3$; greater than 0% to 4% $P_2O_5$, 3–8% $TiO_2$, and 0–4% $ZrO_2$, wherein the following inequality is satisfied, $0.1 < (\%$ of $P_2O_5 + \%$ of $ZrO_2)/(\%$ of $TiO_2) < 0.8$;

greater than 0% to 10% ZnO, greater than 0% to 10% MgO, and greater than 0% to 5% BaO, wherein the following inequality is satisfied;

$3 < (\%$ of $ZnO + \%$ of $MgO + \%$ of $BaO) < 15$;

3–12% $Li_2O$; greater than 0% to 4% $K_2O$; and $As_2O_3$ and $Sb_2O_3$, wherein the following inequality is satisfied $0 < \%$ if $As_2O_3 + \%$ of $Sb_2O_3 < 2$ and wherein crystal sizes of the crystallized glass are not larger than 0.5 μm and the crystallized glass has a surface roughness of not more than 18 Å.

6. A crystallized glass substrate for magnetic disk as claimed in claim 5, wherein a surface roughness of the crystallized glass substrate is not more than 15 Å.

7. A crystallized glass substrate for a magnetic disk comprising β-spodumene solid solution as the predominant crystal phase, produced by forming a melted raw glass, cooling and thereafter heat-treating it, wherein the raw glass has a composition consisting of, expressed in terms of weight percent: 52–65% $SiO_2$; 8–15% $Al_2O_3$; greater than 0% to 4% $P_2O_5$, 3–8% $TiO_2$, and 0–4% $ZrO_2$, wherein the following inequality is satisfied, $0.1 < (\%$ of $P_2O_5 + \%$ of $ZrO_2)/(\%$ of $TiO_2) < 0.8$;

greater than 0% to 10% ZnO, greater than 0% to 10% MgO, and greater than 0% to 5% BaO, wherein the following inequality is satisfied;

$3 < (\%$ of $ZnO + \%$ of $MgO + \%$ of $BaO) < 15$;

3–12% $Li_2O$; greater than 0% to 4% $K_2O$; and $As_2O_3$ and $Sb_2O_3$, wherein the following inequality is satisfied $0 < \%$ if $As_2O_3 + \%$ of $Sb_2O_3 < 2$ and wherein crystal sizes of the crystallized glass are not larger than 0.5 μm and the crystallized glass has a surface roughness of not more than 18 Å.

8. A crystallized glass substrate for magnetic disk as claimed in claim 7, wherein a surface roughness of the crystallized glass is not more than 15 Å.

9. A crystallized glass as claimed in claim 1, wherein a Vickers hardness of the crystallized glass is not more than 680.

* * * * *